UNITED STATES PATENT OFFICE.

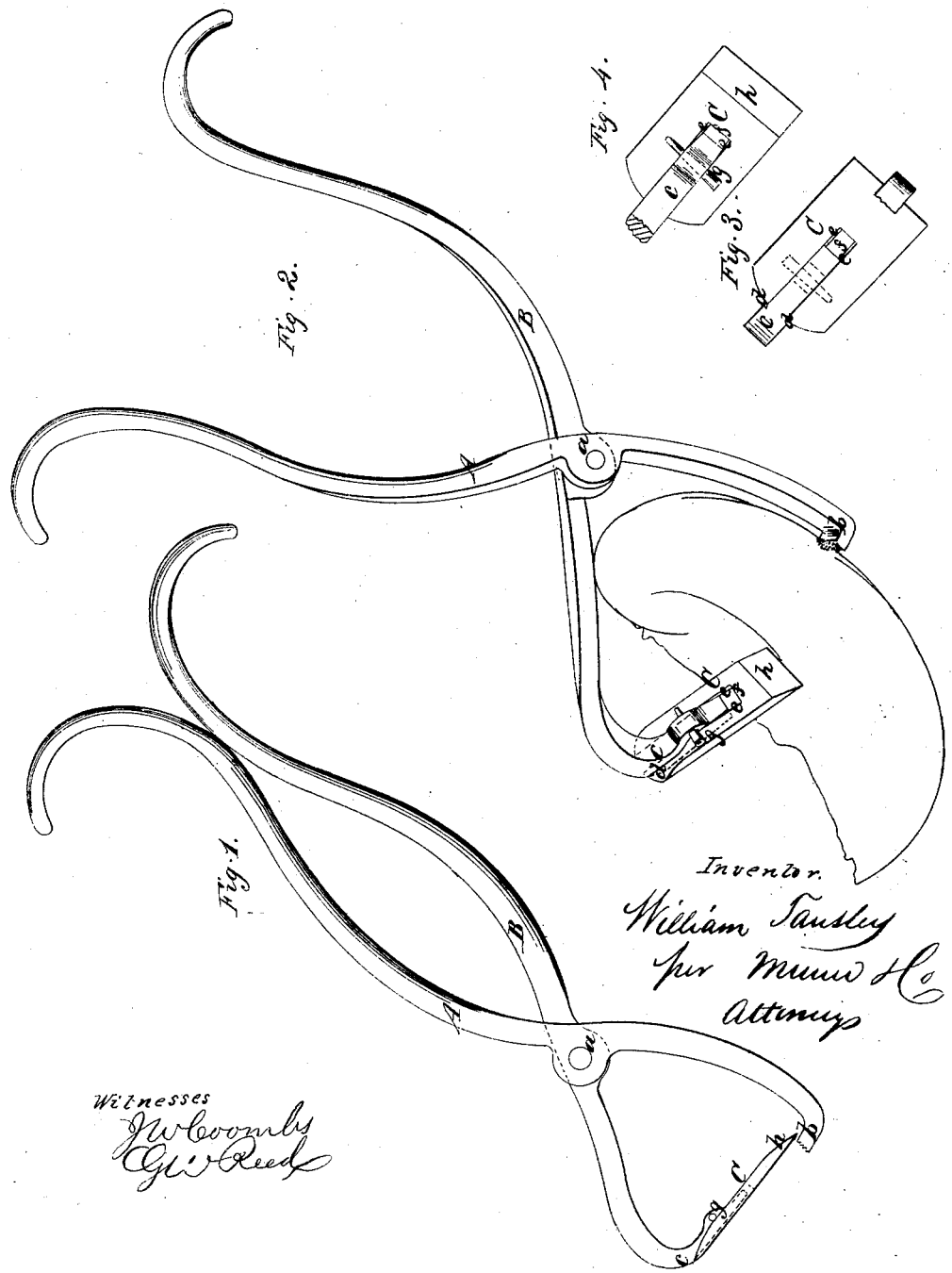

WM. TANSLEY, OF SALISBURY CENTRE, NEW YORK.

IMPROVEMENT IN TOOLS FOR PARING HORSES' HOOFS.

Specification forming part of Letters Patent No. 35,046, dated April 22, 1862.

*To all whom it may concern:*

Be it known that I, WILLIAM TANSLEY, of Salisbury Centre, in the county of Herkimer and State of New York, have invented a new and Improved Butteris or Implement for Paring Horses' Hoofs Preparatory to the Shoeing of the Same; and I do hereby declare that the following is a full, clear, and exact description of the Same, reference being had to the accompanying drawings, making a part of this specification, in which—

Figure 1 is a side view of my invention; Fig. 2, a perspective view of the same; Fig. 3, an end view of the same; Fig. 4, a detached inner or back view of the knife or cutter.

Similar letters of reference indicate corresponding parts in the several figures.

The object of this invention is to obtain an implement which will supersede the ordinary knife or "butteris," as it is technically termed, for paring the hoofs of horses preparatory to shoeing them. The paring of the hoof with the ordinary knife or butteris is the most fatiguing part of a horseshoer's work, and by means of the within-described invention it is believed that this labor can be very materially reduced.

To this end the invention consists in the employment or use of two levers which cross each other and are connected by a fulcrum-pin similar to an ordinary pair of pliers or nippers. The end of one lever forms a jaw, and to the corresponding end of the other lever there is attached a knife, all being so arranged that the jaw end of one lever may be placed against the outer edge of the hoof to be pared, and the knife, by closing the levers under the action of the hand, be made to cut transversely the rim of the hoof at any point desired and to pare off the hoof as may be required.

To enable those skilled in the art to fully understand and construct my invention, I will proceed to describe it.

A B represent two levers, which cross each other, and are connected together by a pivot or fulcrum-pin, *a*. The longer parts of these levers at one side of their fulcrum are curved, so that they may be grasped and operated by the hand of the horseshoer with facility. The shorter part of the lever A is bent or curved at its end at right angles with the portion adjoining it, as shown at *b*, and the end of *b* is corrugated, so that it may penetrate slightly and take a firm hold on the outer part or edge of the hoof to be pared. The shorter part of the lever B is also curved similar to the shorter part of the lever A, and the bent end *c* has a V-shaped groove, *d*, made longitudinally in each side of it to receive the beveled edges *e e* of a slot, *f*, which is made longitudinally in a knife, C. The knife is secured to the end *c* of lever B by means of a taper pin, *g*, which passes transversely through *c*, and bears against the inner side of the knife, and binds or holds it firmly in position on the end *c* of lever B. This mode of securing the knife to the end *c* of the lever B admits of the former being adjusted on the latter, to compensate for wear. The knife C, when the two levers are closed in contact with each other, fits within the jaw or bent end *b* of the lever A, but is not allowed to have its cutting-edge come in contact with lever A, (see Fig. 1,) and the knife and jaw are in parallel planes when the levers are closed. The cutting-edge of the knife is formed by a basil, *h*, made at its inner side, as shown in Figs. 1, 2, and 3.

The implement is used as follows: The operator grasps the longer parts of the levers A B and distends or forces them apart, and places the jaw *b* of lever A against the outer edge of the hoof to be pared, the edge of the knife C being at the inner edge of the rim of the hoof. (See Fig. 2, in which the bottom of a portion of a hoof is shown in red outline.) The levers A B are then closed or pressed together under the action of the hand of the operator, and the knife C makes a cut transversely across the rim of the hoof, and of a greater or less depth, as may be required. The hoof in this way is pared all around until it is brought to a proper state to have the shoe applied to it.

This implement may be used with the greatest facility, and the hoof properly and expeditiously pared with but little labor.

Having thus described my invention, what I claim as new, and desire to secure by Letters Patent as a new and improved article of manufacture, is—

A butteris or hoof-paring implement formed of the two levers A B, connected by a fulcrum-pin, *a*, and provided, respectively, with a jaw, *b*, and knife C, substantially as shown and described.

WILLIAM TANSLEY.

Witnesses:
JESSE B. PITT,
LUCIUS B. BROCKETT.